US005690539A

United States Patent [19]
Swidler et al.

[11] Patent Number: 5,690,539
[45] Date of Patent: Nov. 25, 1997

[54] METHOD OF ABARDING USING SURFACE ABRASION COMPOSITIONS

[75] Inventors: Ronald Swidler, Palo Alto; Edward W. Woodhall, Los Altos, both of Calif.

[73] Assignee: Cal-West Equipment Company Inc., Sunnyvale, Calif.

[21] Appl. No.: 512,055

[22] Filed: Aug. 7, 1995

[51] Int. Cl.$^6$ .............................. B24C 1/08; B24C 1/00; C09C 1/68
[52] U.S. Cl. .................................... 451/38; 451/39
[58] Field of Search ................... 451/36, 39, 38, 451/40; 51/307, 308

[56] References Cited

U.S. PATENT DOCUMENTS

| | | |
|---|---|---|
| 3,865,756 | 2/1975 | Smith . |
| 3,966,432 | 6/1976 | Rayner . |
| 4,005,025 | 1/1977 | Kinstedt ................ 252/99 X |
| 4,265,777 | 5/1981 | Boyer .................... 252/113 |
| 4,460,489 | 7/1984 | Kendall . |
| 4,477,285 | 10/1984 | Ault . |
| 4,537,604 | 8/1985 | Dawson . |
| 4,549,374 | 10/1985 | Basi et al. . |
| 4,555,872 | 12/1985 | Yie . |
| 4,630,407 | 12/1986 | Rhodes . |
| 4,716,685 | 1/1988 | Kuramoto . |
| 4,720,036 | 1/1988 | Lison et al. . |
| 4,941,230 | 7/1990 | Lamore . |
| 5,051,212 | 9/1991 | Culshaw et al. ............ 252/546 |
| 5,056,181 | 10/1991 | Tsuchiya et al. . |
| 5,137,541 | 8/1992 | Foster . |
| 5,174,927 | 12/1992 | Honsa ........................ 252/543 |
| 5,266,088 | 11/1993 | Sandusky et al. . |
| 5,281,354 | 1/1994 | Faber ........................ 252/154 |
| 5,297,363 | 3/1994 | Schroder et al. . |
| 5,340,493 | 8/1994 | Principato ................. 252/462 |
| 5,421,906 | 6/1995 | Borah ........................ 134/26 |
| 5,472,455 | 12/1995 | Mehreteab et al. . |
| 5,476,411 | 12/1995 | Held, III ................... 451/36 |
| 5,512,071 | 4/1996 | Yam et al. . |
| 5,520,711 | 5/1996 | Helmin . |

FOREIGN PATENT DOCUMENTS

| | | |
|---|---|---|
| 1279788 | 11/1989 | Japan . |
| 4083879 | 3/1992 | Japan . |

*Primary Examiner*—Timothy V. Eley
*Attorney, Agent, or Firm*—Townsend and Townsend and Crew LLP

[57] ABSTRACT

This invention provides for provides for abrasive compositions and methods of use of these compositions for the preparation of surfaces for the application of various coatings such as paints, lacquers and varnishes. The abrasive compositions of this invention provide rapid cleaning and dulling of the underlying surface rendering it suitable for the application of paints or other finishes.

21 Claims, No Drawings

METHOD OF ABARDING USING SURFACE ABRASION COMPOSITIONS

BACKGROUND OF THE INVENTION

The present invention relates to abrasive compositions and their use in the preparation of surfaces for the application of paint.

The proper application of various finishing materials, in particular high-gloss paint finishes, typically requires cleaning and abrasion of the underlying surface in order to provide a surface that forms a strong adhesive bond with the newly applied finishing material. Cleaning and abrasion of the underlying surface is particularly important to the successful finishing of surfaces that are dirty, oily, greasy, or otherwise soiled and/or have a preexisting finish (e.g. a primer or undercoat, or a high gloss finish).

Surface finishing processes are particularly common in the automotive industry. Motor vehicles (e.g. cars, trucks, motorcycles, etc.) are frequently subject to elaborate painting processes during the manufacture or subsequent refinishing of the vehicle. These processes often require application of numerous coats of paint (or other finish) and the application of each coat typically requires preparation (e.g. cleaning and abrading) of the underlying surface.

Vehicle surfaces typically bear high gloss acrylic or eurothane finishes, often with a wax or polybond topcoat. In addition, vehicle surfaces are often soiled with dirt and/or grease, either from the manufacturing operation or subsequent use, and thus provide surfaces that must be cleaned prior to application of a subsequent coating. Even during vehicle assembly, components are often supplied with a primers or undercoats that must be cleaned and abraded to enhance the adhesion of the subsequently applied coating.

Surface abrasion is often accomplished with the use of scuff-pads, abrasive pads, sanding, or sand blasting. These approaches are typically expensive, time-consuming, and laborious and usually require subsequent cleaning and decreasing.

While the use of abrasive compositions for surface cleaning and abrasion is generally known, most abrasive compositions do not provide a surface well suited to the subsequent application of finishes. Typical abrasive compositions include polishing or rubbing compounds, abrasive cleansers, and abrasive compositions for the removal of oxidation layers (e.g. rust removal compositions). Of these, rust removal and abrasive cleansers are most appropriate for the preparation of surfaces for subsequent coating operations as rubbing compounds tend to increase polish and shine rather than dully underlying surfaces.

Abrasive cleansers (scouring powders) and rust removal compounds, however, have proven unsatisfactory as surface preparatives. Scouring powders often fail to provide adequate or consistant (uniform) dulling of the underlying surface. In addition, scouring powders typically include a soap that leaves a residual film which has proven difficult to remove and which interferes with the adhesion of subsequently applied finishes. A similar problem has been observed with variious abrasive pastes.

Rust removal compositions typically include an acid degreaser use of which entails some health risk and requires protective equipment. The acid component of rust removal compositions may also attack chrome trim which may be present on the surface. Finally, paste-like silicate abrasives which are more easily removed from the underlying surfaces, tend to dry out to powders which become airborne and provide a significant airborne health hazard.

SUMMARY OF THE INVENTION

The present invention provides for abrasive compositions and methods of use of these compositions for the preparation of surfaces for the application of various coatings or finishes such as paints, lacquers and varnishes. The abrasive compositions of the present invention provide rapid cleaning and dulling of the underlying surface with little effort, increase the useful life of abrasive devices such as scuff pads, are easily removed from the abraded surface with only a water rinse, and provide no significant environmental impact.

In one embodiment, the abrasive compositions of this invention comprise a particulate abrasive and a suspension agent. The particulate abrasive may be selected from the group consisting of a pumice, silica, calcium carbonate, ninex, boron nitride, metal carbides, diamond dust, and various metal oxides including aluminum oxide and iron oxide with crystalline silica or feldspar being particularly preferred. The particulate abrasive is selected with a particle size and hardness sufficient to dull a paint finish on a surface, in particular a metal surface.

The suspension agent is preferably a gelatinous or foamy suspension agent. Preferred suspension agents include, but are not limited to, starches, modified starches, cellulose, modified cellulose, acrylic polymers, polymer emulsions and clays.

The abrasive composition may additionally comprise a surfactant. Preferred surfactants include a high HLB surfactant and a low HLB surfactant, more preferably nonionic high and low HLB surfactants. The surfactant may additionally include an ionic surfactant, more preferably a high foaming ionic surfactant.

The abrasive composition may also include a cleaning agent. Preferred cleaning agents include one or more water soluble alcohols and/or one or more aliphatic hydrocarbon. Preferred aliphatic hydrocarbons include D-limonine, Carvone, ethoxylate, dodecane and isopar-G. Preferred water soluble alcohols include methyl alcohol, ethyl alcohol, propyl alcohol, isopropyl alcohol, ethylene diol, propylene diol, ethanolamine, and the like.

Foam height stabilizers may also be present in the abrasive composition. Preferred foam height stabilizers include fatty acid amides, more particularly fatty acid amides such as Ninol, Maypon, Sarkosyl, Igepon, Hallcomid, Acrawax, Kemamide, Armowax, Ethomid, and the like.

A neutralizing agent may be present to adjust the pH of the abrasive composition. Suitable neutralizing agents include water soluble bases well known to those of skill in the art. Preferred bases include, but are not limited to, sodium hydroxide, sodium bicarbonate and amine bases such as pyridine and ethylamine and ammonia. In a preferred embodiment, the neutralizer is triethanolamine and the abrasive composition is adjusted to a neutral pH.

Finally a humectant may be present to maintain water content of the abrasive composition. Suitable humectants include, but are not limited to glycerine, polyethylene glycol, polypropylene glycol, and the like.

In one embodiment, the abrasive composition includes a particulate abrasive; a suspension agent; and a surfactant, while in another embodiment the abrasive composition includes a particulate abrasive; a suspension agent; and a cleaning agent. In yet another embodiment the abrasive composition includes a particulate abrasive; a suspension agent; a surfactant; and a cleaning agent.

A particularly preferred abrasive composition includes a particulate abrasive; a suspension agent; a surfactant comprising a nonionic high HLB surfactant, a nonionic low HLB surfaetant and an ionic surfactant; and a cleaning agent comprising a an aliphatic hydrocarbon. The cleaning agent may additionally comprise a water soluble alcohol.

Another particularly preferred abrasive composition includes a particulate abrasive; a suspension agent; a surfactant comprising a nonionic high HLB surfactant, a nonionic low HLB surfactant and an ionic surfactant; a cleaning agent comprising an aliphatic hydrocarbon; and a humectant. Here, as well, the cleaning agent may additionally comprise a water soluble alcohol.

Still another particularly preferred abrasive composition includes a particulate abrasive; a suspension agent; a surfactant comprising a nonionic high HLB surfactant, a nonionic low HLB surfactant and an ionic surfactant; a cleaning agent comprising a water soluble alcohol and an aliphatic hydrocarbon; and a foam height stabilizer. Other particularly preferred abrasive compositions are detailed in Example 1.

This invention also provides for methods of preparing (e.g. cleaning and abrading) a surface for application of a finish. The methods include the steps of abrading the surface with any of the abrasive compositions described herein and then removing the abrasive composition from the surface. The surface is preferably a metal surface, more preferably a painted metal, rubber, or plastic surface. The surface may be the surface of a motor vehicle such as a car, a truck, a motor cycle, or a multi-purpose vehicle.

The abrasion may be by means of an applicator such as a scuff-pad, sandpaper, abrasive pad, brush, and the like.

The abrasive composition may be removed by any means including mechanical means such as wiping with a squeegee, a sponge, or a cloth, or chemical means such as application of a solvent. A preferred removal method is washing with water. The cleaned and abraded surface may then be dried prior to application of a finish.

Unless stated otherwise, and of course except when referring to water or other components whose active ingredients are liquid, all weight percentages herein, refer to the dry weight of the active material. Also, unless otherwise stated, weight percentages are given as weight percentages of the total aqueous composition. Various commercial components may contain water and/or other solvents in addition to the active material. The coatings of this invention are compounded as aqueous solutions. As indicated above, water may therefore comprise up to about 80 percent, by weight, of the composition.

A further understanding of the nature and advantages of the invention described herein may be realized by reference to the remaining portions of the specification.

DETAILED DESCRIPTION

The present invention provides for abrasive compositions and methods of use of these compositions for the preparation of surfaces for the application of various coatings such as paints, lacquers and varnishes. The abrasive compositions of the present invention provide rapid cleaning and dulling of the underlying surface with little effort, increase the useful life of abrasive devices such as scuff pads, are easily removed from the abraded surface with only a water rinse, and provide no significant environmental impact.

In addition, the abrasive compositions of the present invention provide unusually consistent abrasion. Unlike sanding and other techniques which often result in an irregularly dulled surface, the compositions of this invention provide and extremely uniform dulling with a minimum of individual scratches visible to the naked eye. This results in particularly even distribution of subsequent finishes. This is especially important to the application of metallic and multiple stage paints which tend to render even minor underlying discontinuities highly visible.

With the use of less aggressive solvent systems in paints and other finishes, due to concern over environmental impact, surface preparation has become increasingly important to ensure adhesion of the finish. The extremely consistent and effective dulling of the underlying surface coupled with easy and complete removal of the abrasive composition with only a water wash has been shown to result in unusually effective adhesion of subsequently applied finishes.

Thus, in one embodiment, this invention provides for a method of preparing a surface for application of a coating. The method involves abrading the surface with one of the abrasive compositions of this invention and then removing the abrasive composition from the surface.

One of skill in the art will appreciate that the abrasive compositions of this invention may be used on virtually any surface. However, in a preferred embodiment, the abrasive compositions will be used on a metal, rubber, or plastic surface. The surface may be bare metal, oxidized metal, metal already coated with a primer or undercoat, or metal coated with a final or finish coat. Similarly, suitable plastic or rubber surfaces may be bare or coated with a primer, undercoat, or finish coat. The abrasive compositions of this invention may be used on any coatings known to those of skill in the art, including, for example, palms (e.g. acrylic or urethane), varnishes, lacquers, and the like.

The abrasive compositions may be used on any metal surface that is to be subsequently coated with a finish. This may include, for example, metallic (e.g. aluminum) siding, metallic fencing, appliance sidings, metallic components of virtually any article of manufacture. The abrasive compositions of the present invention, however are particularly well suited to the preparation of vehicles, in particular to the metal surfaces of motor vehicles such as cars, trucks, motorcycles, multi-purpose vehicles (MPVs), and the like. In a particularly preferred embodiment, the abrasive compositions are used to prepare metal surfaces for the application of acrylic automotive paints.

Typically, the abrasive composition is applied either directly to the surface to be prepared or to an applicator, a device that will be used to apply the abrasive composition to the surface. Application directly to the surface or to the applicator may be by any means well known to those of skill in the art including pouring directly on the surface, dipping the surface, spraying, application by roller, pumping, and the like. The applicator may additionally contain a reservoir that is filled with the abrasive composition and which delivers the composition to the surface of the applicator through one or more channels. The composition may be delivered through the channels by passive flow or under pressure, for example, by pumping or pressurized gas.

After application to either the surface or the applicator, the abrasive composition is rubbed against the underlying surface thereby cleaning and abrading the surface. In a preferred embodiment, the applicator is used to rub the abrasive against the surface. Suitable applicators are well known to those of skill in the art and include, but are not limited to cloth or cloth pads, scouring pads, sponges, scuff pads, brushes, sandpaper, abrasive matrix materials, and the like.

The rubbing action may be provided by manual manipulation of the application device or through use of a motorized application device such as a rotary sander or buffer, random orbital sander, belt sander, roller applicators, and the like which are well known to those of skill in the art.

Visual inspection is sufficient to determine when the underlying surface is sufficiently abraded (dulled) to permit successful application of the subsequent finish. However, because of the extremely uniform and consistent abrasion provided by the abrasive compositions of this invention, the methods of this invention are suitable for automated determination of the appropriate endpoint for the abrasive process. This may be accomplished simply by running an automated abrasion device for a fixed time period, of by the use of an optical system that detects dullness of the underlying surface and stops the abrasion process at the appropriate endpoint.

When the underlying surface is sufficiently cleaned and abraded, the abrasive composition is removed. This may be accomplished by any convenient mechanical and/or chemical means. Suitable mechanical means include scrapers, squeegees, wiping (as with a cloth, brush, or sponge) and the like. The mechanical means may be used alone, or in conjunction with an appropriate solvent. In a particularly preferred embodiment, removal is by washing with water.

The surface may then be dried by any means generally known to those of skill in the art including, but not limited to, air drying or force drying, for example, by the application of heat (e.g. radiant heating, oven baking, or hot air blowers), the reduction of air humidity, an increase in air movement or any combination of these means. One of skill will appreciate that certain finishes (e.g. water soluble latex paints) may not require drying of the surface prior to application of the finish.

The cleaned and dulled surface is then ready for application of a suitable finishing material such as a paint, lacquer, or varnish according to standard methods well known to those of skill in the art.

In a preferred embodiment, the abrasive compositions of the present invention are aqueous suspensions of a particulate abrasive. Thus, the compositions typically include an abrasive component and a suspension agent (to keep the abrasive component in suspension) with water generally providing the remainder of the composition. In various preferred embodiments, the composition may additionally include cleaning agents to provide additional degreasing and cleaning activity, surfactants to provide lubrication and to improve wetting of the underlying surface, and hydration agents (humectants) to prevent dehydration of the abrasive composition during use. The composition may also include various other additives such as pigments or dyes for coloration, fragrances, UV blocking components, neutralizing compounds to regulate pH, foam height stabilizers, to maintain gel consistency, and the like.

The particulate abrasive used in the abrasive composition may include any material having suitable strength, integrity, hardness and the like to provide the required abrading treatment to the surface to be treated. It will be appreciated that the requirements for the abrasive material will vary depending upon the surface to be treated and the desired effect on the surface. Generally, the particulate abrasive is selected so as to give effective abrasive action that uniformly dulls an underlying finish without undue scratching. Relatively soft abrasive materials may be suitable in certain applications and indeed may be desirable where the surface is of a consistency that cannot withstand severe treatment. However, on most surfaces, relatively hard particulate abrasives are preferred. Suitable abrasives include pumice, silica, calcium carbonate, ninex, boron nitride, various metal carbides, diamond dust, various metal oxides such as aluminum oxide, iron oxide, and the like.

Various silicates, especialy various alkalai metal silicates (e.g. feldspar) provides a particularly preferred abrasive. Without being bound to a particular theory, it is believed that the feldspar continuously fractures during the abrasive process thereby providing new sharp edges that act to cut and abrade the surface to which they are applied. The effect is that feldspar provides a high level of abrasion throughout the use of the composition and does not show the progressive dulling (loss of abrasive activity) observed with some other particulate abrasives.

One of skill will appreciate that preferred particle size varies with the hardness of the particle and the finish on the surface that is to be abraded. Particle size may be adjusted according to methods well known to those of skill in the art. For example, an abrasive gel composition of the present invention is made up with a particular particle size and used on a representative test panel. If excessive scratching is observed, then the particle size is reduced. Conversely, if the composition shows inadequate abrasive action, the particle size is increased.

A particularly preferred abrasive particle has a mean particule size of about 12 μm and a Mohs hardness ranging from about 6.0 to about 6.5. A preferred particle size distribution is one in which substantially the whole of the particulate material, when dry, passes through a 100 Mesh Sieve and at least 50%, more preferably 75% and most preferably about 90% passes through a 325 mesh sieve. Particularly preferred abrasives include feldspars comparable to MINSPAR 170 and MINSPAR 200, and crystalline silicas comparable to TAMSIL-75 and TAMSIL-150 (Unimin Specialty Minerals Inc., Tamms, Ill.) which are illustrated in Table 1.

TABLE 1

Particle size distribution of MINSPAR, TAMSIL-75 and -TAMSIL-150.

|  | MINSPAR 200 | TAMSIL-75 | TAMSIL-150 |
| --- | --- | --- | --- |
| 50 Mesh Sieve, % retained | — | 0.00 | 0.00 |
| 70 Mesh Sieve, % retained | — | 0.00 | 0.01 |
| 100 Mesh Sieve, % retained | trace | 0.02 | 1.11 |
| 140 Mesh Sieve, % retained | 0.02 | 0.15 | 3.71 |
| 170 Mesh Sieve, % retained | 0.08 | — | — |
| 200 Mesh Sieve, % retained | 0.30 | 2.00 | 8.81 |
| 270 Mesh Sieve, % retained | — | 7.69 | 16.01 |
| 325 Mesh Sieve, % retained | 3.60 | 11.10 | 20.11 |

An abrasive content of about 10% to about 85% has been found suitable, with about 10% to about 50% being preferred, about 10% to about 30% being more preferred and about 10% to about 20% being most preferred. In a number of embodiments, about 14% particulate abrasive has proven particularly effective.

The abrasive compositions of the present invention preferably include a suspension agent to maintain the particulate abrasive in an aqueous suspension. The inclusion of a suspension agent improves the homogeneity of the composition and prevents clumping of the particulate abrasive. In use, a composition comprising a homogeneously distributed particulate abrasive results greater uniformity of abrasive action over the underlying surface. The suspension agent thereby facilitates the even dulling of the underlying surface without distinct or visible scratches. The reduction of distinct or visible scratches is desirable because such discontinuities tend to accumulate the subsequently applied coating resulting in an uneven finish.

In addition, the suspension agent acts to suspend particles abraded off of the underlying surface. By clearing (suspending) the abraded particles away from the underlying surface, new surface is constantly exposed to the abrasive particles thereby causing rapid abrasion of the underlying surface. In addition, the material abraded off, does not clump and is less likely to act as an abrasive particle itself which might otherwise unduly scratch the underlying surface. Finally, suspension of the abraded particles prevents clogging or "filling" of the Application device. This effectively prolongs the useful life of the applicator (e.g scouring pad, sandpaper, or brush).

Any water soluble thickener provides a suitable suspension agent. However, preferred suspension agents may be easily washed off of the underlying surface without leaving a residual film that may interfere with subsequently applied coatings. Particularly preferred suspension agents form a gel or foam (as opposed to a paste or film) that is easily removed with water. Thickening agents are well known to those of skill in the art and include natural product thickeners such as cellulose, cellulose derivatives (e.g. hydroxycellulose, methylcellulose, hydroxyethylcellulose, hydroxymethylcellulose, etc.), starch or modified starches, dextrins, and the like.

Various natural and synthetic clay type suspension agents may also be used. Suitable natural clays include attapulgite and bentonite. An example of a synthetic clay is an inorganic complex silicate clay. Several grades of synthetic clay are available as Laponite™ (e.g. from Laporte Industries Limited). Other useful suspending agents are the freely divided hydrophobicly treated clays such as a reaction product of a clay such as a bentonite, hectorite or Laponite with, for example, dimethyldisteryl ammonium chloride. These suspending agents are the hydrophobically treated montmorillonite or hectorite clays available under the tradename Bentone" which are prepared by reacting a clay such as bentonite or hectorite in a cation exchange system with a variety of amines. Different amines are reacted to obtain different Bentone suspending agents which may also differ in proportions of $SiO_2$, MgO and $AlO_3$. Examples of useful Bentone suspending agents are Bentone-27 which is a stearaluminum hectorite, Bentone-34 which is a quaternium 18 bentonite, Bentone-38 which is a quaternium 18 hectorite and Bentone-14 which is a clay extended quaternium 18 hectorite, all of which have a particle size of below about 5 microns and are commercially available.

Particularly preferred thickeners include various polymer or polymer emulsion thickeners such as silicone based thickeners, acrylic emulsion thickeners (e.g., Carbopol® EP1, Carbopol® 1324, etc.) and acrylic polymers (e.g. EZ-1) and the like.

The amount of suspension agent in the abrasive composition is variable, however, in a preferred embodiment, the amount of suspension agent is adjusted to provide a gelatinous or foam-like consistency. In a preferred embodiment, the thickener may be present at about 0.1% to about 10%, more preferably at about 1% to about 7%. by weight, of the total composition. Typically, clay and polymer thickeners are preferably present at a lower concentration (e.g. about 1.5% to about 3%, by weight) than polymer emulsions (e.g. about 6% to about 7%, by weight).

As indicated above, the abrasive compositions of the present invention may include a cleaning agent. The cleaning agent acts to remove grease, oils, and other soiling materials. Preferred cleaning agents are those that leave no residual film or contaminant that may interfere with the subsequent bonding of a coating material (e.g. acrylic paint). While water insoluble cleaning agents are suitable, to facilitate compounding into an aqueous based abrasive composition and to facilitate removal of the composition once the underlying surface is suitably cleaned and abraded, water-soluble cleaning agents are preferred.

Particularly preferred water soluble cleaning agents include one or more water soluble alcohols and/or one or more aliphatic hydrocarbons. Water soluble alcohols are well known to those of skill in the art and include, but are not limited to ethyl alcohol, methyl alcohol, propyl alcohol, isopropyl alcohol, ethylene diol, propylene diol, ethanolamine, and the like. Absolute alcohols are suitable although 95% alcohols are preferred.

The alcohols generally increase wetting of the underlying surface by the abrasive composition. In addition the alcohols facilitate the dispersion of low HLB surfactants, if they are present.

When an alcohol is present in the abrasive composition, it is preferably present at about 0.1% to about 5%, more preferably about 0.5 to about 3.0% and most preferably about 1.0% to about 2.0%, by weight, of the total abrasive composition.

As indicates above, the cleaning agent may comprise one or more aliphatic hydrocarbon cleaning solvents, alone or in combination with the alcohol. Preferred hydrocarbon cleaning solvents relatively nontoxic. Suitable aliphatic hydrocarbon cleaning agents are well known to those of skill in the art and include, but are not limited to, cyclic monoterpenes such as Carvone or Limonine, or other hydrocarbon cleaning agents such as dodecane, isopar-G, and the like.

When an aliphatic hydrocarbon cleaning solvent is present, it is preferably present at about 0.1% to about 5%, more preferably about 1% to about 3% and most preferably at about 1.0% to about 2.0%, by weight, of the total composition.

In a preferred embodiment, the cleaning agent includes both a water soluble alcohol and a hydrocarbon cleaning solvent. In a particularly preferred embodiment, the ratio of alcohol to hydrocarbon solvent is about 1:2, by weight. In one preferred embodiment, the abrasive composition comprises about 1%, by weight, alcohol and about 2%, by weight hydrocarbon solvent, with a combination of ethyl alcohol and limonine being particularly suitable.

The abrasive compositions of the present invention may also include one or more surfactants. The surfactants improve wetting of the underlying surface, facilitate solubilization of oils, greases and other soiling materials, and provide lubrication for the abrading process, as well.

Suitable surfactants include ionic surfactants (cationic or anionic), nonionic surfactants, and amphoteric surfactants. Examples of nonionic surfactants include monoethers of polyethylene glycols and long chain alkanols in which the alkanol has 10 to 16 carbon atoms and the polyethylene glycol has 5 to 15 oxyethylene units. Such monoethers of polyethylene glycol are generally made by reacting the alkanol with ethylene oxide. Such nonionic surfactants are well known to those of skill in the art and are commercially available. For example, commercially available Neodol 25-7, a nonionic surfactant, is an adduct of 7 mols of ethylene oxide and 1 mol of a mixture of alkanols of 12 to 15 carbon atoms. Other related nonionic surfactants include Neodol 4511, Neodol 2503, Alfonic 1618-65, Plurafac B26, and the like.

Ionic surfactants include anionic and cationic surfactants. Suitable anionic surfactants are well known to those of skill in the art and include, but are not limited to various carboxylates, N-acylsarcosinates, acylated protein hydrolysates including various sulfonates, ethoxylated and/or sulfonated alkylphenols, and the like. Cationic surfactants are also well known to those of skill in the art and include, but are not limited to aliphatic mono-, di- and polyamines derived from fatty and rosin acids, quaternary ammonium salts, and the like.

Suitable amphoteric surfactants include, but are not limited to, the alkylbetaines, alkyldimethylamines, amphoteric imidazolinium derivatives, and the like.

In a preferred embodiment, the surfactant includes two nonionic surfactants, one a low hydrophile-lipophile balance (HLB) surfactant and the other a high (HLB) surfactant. (The hydrophile-lipophile balance is an expression of the relative simultaneous attraction of surfactant for water and for oil [or for the two phases of the emulsion system being considered]). Without being bound to a particular theory, it is believed that the low HLB surfactant partitions into the hydrocarbon (hydrophobic) phase of the abrasive composition (which will also include oily contaminants on the underlying surface) effectively incorporating some water into the hydrophobic phase. The high HLB surfactant then acts as an emulsifier effectively solubilizing the HLB surfactant. In a particularly preferred embodiment, nonionic low HLB and high HLB surfactants are combined with a high foaming ionic surfactant which provides foam height and helps lift abraded particles, dirt and oil up away from the underlying surface.

As used herein, a low HLB surfactant is one which has an HLB number ranging from about 3 to about 8, while a high HLB surfactant is one which has an HLB number ranging from about 9 to about 2.

In a preferred embodiment, the surfactant comprises Neodol 25-3 as the low HLB surfactant (HLB number about 7.8) and Neodol 25-7 as the high HLB surfactant (HLB number about 12.3) and Rhodaplex CO 436, sodium dodecyl sulfate, dioctylsodiumsulfosuccinate (e.g. Acrosol OT-75), Steol CA-460, or Steol CS-460 as the high foaming surfactant. Other suitable high HLB, low HLB and high foaming surfactants will be known to those of skill in the art.

The total surfactant comprises about 0.01% to about to about 6.0%, more preferably about 0.01 to about 3.0% and most preferably about 0.0% to about 2.0% of the total composition. The high and low HLB surfactants are preferably present in equal concentration with the concentration of each ranging from about 0.01% to about 2%, more preferably about 0.01% to about 1% and most preferably about 0.01% to about 0.5% of the total abrasive composition. The high foaming surfactant is preferably present in a concentration equivalent to the combined high and low HLB surfactants, with a concentration preferably ranging from about 0.01% to about 2%, more preferably from about 0.01% to about 1.5%, and most preferably from about 0.01% to about 1% of the total abrasive composition.

To improve foam height and thereby particle suspension properties, the abrasive composition may additionally include a foam height stabilizer. Preferred foam height stabilizers, especially the fatty acid amides, also increase detergency and adhere to metals surfaces thereby improving lubricicity. Again, preferred foam height stabilizers are easily removed with a water wash. Suitable foam height stabilizers include, but are not limited to, various substituted fatty acid amides such as Ninol, Maypon, Sarkosyl, Igepon, Hallcomid, Acraswx, Kemamide, Armowax, Ethomid, and the like.

The foam height stabilizer, when present, comprises about 0.1% to about 5%, by weight, more preferably about 0.5% to about 3% and most preferably about 1% to about 2%, by weight, of the total abrasive composition.

Particularly where polymer emulsions are used as thickeners or amphoteric surfactants are present, the abrasive composition may additionally include a "neutralizer" to adjust the pH of the composition. Means of adjusting pH are well known to those of skill in the art. Particularly where a polymer emulsion is present it is desirable to add a base to neutralize the emulsion. This may be accomplished by the addition of one of a number of water soluble bases well known to those of skill in the art. These include, but are not limited to sodium hydroxide, sodium bicarbonate and amine bases such as pyridine and ethylmine and ammonia. In a preferred embodiment, the neutralizer is triethanolamine and the abrasive composition is adjusted to a neutral pH.

In order to reduce water loss and drying, the abrasive compositions of this invention may additionally contain a hydration agent or humectant. Suitable humectants are well known to those of skill in the art and include, but are not limited to glycerine, polyethylene glycol, polypropylene glycol, and the like.

In a particularly preferred embodiment, the humectant is glycerine or polyethylene glycol. The humectant may be present at about 1% to about 10%, more preferably about 2% to about 7%, and most preferably about 3% to about 5%, by weight, of the total abrasive composition.

As explained above, the abrasive compositions of the present invention are made up as aqueous solutions. Thus, in addition to the components recited above, the compositions are largely water. One of skill will appreciate however, that the compositions may include other components such as dyes, fragrances, various gases to improve foam formation, and the like.

While the abrasive compositions may comprise a particulate abrasive and a suspension agent, one preferred embodiment additionally includes a cleaning agent, while another preferred embodiment additionally includes a surfactant. A particularly preferred embodiment additionally includes both a cleaning agent and a surfactant and, where necessary to obtain a neutral pH, a neutralizer. One particularly preferred abrasive composition includes about 14%, by weight, particulate abrasive (e.g. feldspar, Minispar 170 or 200), about 0.5%, by weight, low HLB surfactant (e.g. Neodol 25-3), about 0.5%, by weight high HLB Surfactant (e.g. Neodol 25-7), about 0.5%, by weight, high foaming surfactant (e.g. Rhodaplex CO-436), about 1%, by weight alcohol (e.g. ethanol), about 2%, by weight hydrocarbon solvent (e.g. limonine), about 6.25% suspension agent (e.g. EP-1 polymer emulsion), and about 0.5%, by weight neutralizer (e.g. neutroline) and remainder (about 74.75%, by weight) water. In other preferred embodiments, the suspension agent may be about 2.5%, by weight, bentonite, or about 1%, by weight, EZ-1. The triethanolamine may be present or absent.

One particularly preferred alcohol-free formulation includes includes about 14%, by weight, particulate abrasive (e.g. feldspar, Minispar 170 or 200), about 0.5%, by weight, low HLB surfactant (e.g. Neodol 25-3), about 0.5%, by weight, high HLB surfactant (e.g. Neodol 25-7), about 0.5%, by weight, high foaming surfactant (e.g. OT 75), about 2%, by weight hydrocarbon solvent (e.g. D-limonine), about 6.25% suspension agent (e.g. EP-1 polymer emulsion), and remainder (about 76.08%, by weight) water. This formulation may additionally include about 2%, by weight, humectant (e.g. glycerine). In other preferred embodiments, the suspension agent may be about 2.5%, by weight, bentonite, or about 1%, by weight, EZ-1. The triethanolamine may be present or absent.

Another embodiment, includes about 5%, by weight, particulate abrasive (e.g. feldspar, Minispar 170 or 200), about 0.5%, by weight, low HLB surfactant (e.g. Neodol 25-3), about 0.5%, by weight high HLB surfactant (e.g. Neodol 25-7), about 1.0%, by weight hydrocarbon solvent (e.g. limonine or isopar G), about 8.33% suspension agent (e.g. stearic acid), and about 0.4.16%, by weight neutralizer (e.g. neutroline) and remainder (about 80.51%, by weight) water.

Another preferred abrasive composition includes about 14%, by weight, particulate abrasive (e.g. feldspar, Minispar 170 or 200), about 0.5%, by weight, low HLB surfactant (e.g. Neodol 25-3), about 0.5%, by weight high HLB surfactant (e.g. Neodol 25-7), about 0.67%, by weight, high foaming surfactant (e.g. Aerosol OT-75), about 1%, by weight alcohol (e.g. ethanol), about 2%, by weight hydrocarbon solvent (e.g. limonine), about 6.25% suspension agent (e.g. EP-1 polymer emulsion), and remainder (about 75.08%, by weight) water. Again, the suspension may be about 2.5%, by weight, bentonite, or about 1%, by weight, EZ-1. Triethanolamine may be present or absent.

In another preferred embodiment, the abrasive compositions may comprise a particulate abrasive, a suspension agent, a cleaning agent, a surfactant, a humectant, and where necessary (to obtain a neutral pH) a neutralizer. A particularly preferred embodiment includes about 14%, by weight, particulate abrasive (e.g. feldspar, Minispar 170 or 200), about 0.5%, by weight, low HLB surfactant (e.g. Neodol 25-3), about 0.5%, by weight high HLB surfactant (e.g. Neodol 25-7), about 0.67% a high foaming surfactant (e.g. Aerosol OT-75), about 1%, by weight alcohol (e.g. ethanol), about 2%, by weight hydrocarbon solvent (e.g. limonine), about 3.0%, by weight, humectant (e.g. glycerine), about 6.25% suspension agent (e.g. EP-1 polymer emulsion), and remainder (about 72.08, by weight) water. Again, the suspension may be about 2.5%, by weight, bentonite, or about 1%, by weight, EZ-1. Triethanolamine may be present or absent.

In still yet another embodiment, the abrasive compositions may comprise a particulate abrasive, a suspension agent, a cleaning agent, a surfactant, foam height stabilizer and, where necessary (e.g. to obtain a neutral pH), a neutralizer. A particularly preferred embodiment includes about 14%, by weight, particulate abrasive (e.g. feldspar, Minispar 170 or 200), about 0.5%, by weight, low HLB surfactant (e.g. Neodol 25-3), about 0.5%, by weight high HLB surfactant (e.g. Neodol 25-7), about 0.84% a high foaming surfactant (e.g. Rhodaplex CO 436), about 1.5%, by weight alcohol (e.g. ethanol), about 1.0%, by weight, foam height stabilizer (e.g. Ninol 30-LL), about 6.25% suspension agent (e.g. EP-1 polymer emulsion), and remainder (about 75.41%, by weight) water. Again, the suspension may be about 2.5%, by weight, bentonite, or about 1%, by weight, EZ-1. Triethanolamine may be present or absent.

The abrasive composition may be made by conventional means, typically including the steps of mixing the components of the abrasive material at substantially atmospheric pressure, so as to form a substantially homogeneous mixture. The material may then be packaged in any vessel capable of storing aqueous solutions. Alternatively, where the applicator device includes a reservoir to contain the abrasive composition, the composition may be stored in the applicator device itself.

For example, an applicator device may include an abrasive pad attached to a handle. The handle may provide a reservoir for storage of the abrasive composition which is then delivered to the face of the abrasive pad through one or more channels. The channels may be sealed with a removable seal (e.g. a perforable foil seal) which may be perforated just prior to use.

The abrasive composition may also be provided in a sprayer or a pressurized spray container. The pressurized spray container may contain a compressed gas that serves both as a propellant and to aid in foam creation.

EXAMPLES

The following examples are offered to illustrate, but not to limit the present invention.

Example 1

The following components were combined at room temperature and at atmospheric pressure by slow stirring to form a suitable surface protective coating composition of the invention.
Basic formulation:

| | Component | % of total composition |
|---|---|---|
| Particulate Abrasive | Minispar 200 or 170 | 14.0 |
| Suspension Agent | EP-1 | 6.25 |
| Surfactant: | Rhodaplex CO 436 | 1.0 |
| | Neodol 25-7 | 0.5 |
| | Neodol 25-3 | 0.5 |
| Cleaning Agent: | Ethyl alcohol | 1.0 |
| | D-Limonine | 2.0 |
| Neutralizing Agent: | triethanolamine | 0.5 |
| Water | | |

In other variations, the EP-1 may be substituted with 1% EZ-1 (B.F. Goodrich), or about 2.5% bentonite (Bentonite Corp.). The Rhodaplex CO-436 may be substituted with sodium dodecyl sulfate (Aerosol TO-75).

Automotive body test panels coated with an acrylic finish were abraded, by hand using the abrasive composition provided above and a scuff-pad applicator. Abrasion of the test surface, using the abrasive composition, took only about one third as long as abrasion without the abrasive composition. The abrasive composition thus provided as significant decrease in required labor. In addition, wear life of the scuff pads was significantly increased.

The abrasive provided good uniform dulling of the underlying finish with no significant distinct scratches or blemishes. Where the abrasive contacted chrome trim, there was no significant dulling of the chrome visible to the naked eye.

After the finish was dulled, the abrasive composition was rinsed off with water and the panel was allowed to dry. An anchor was glued to the test surface and the force to remove the applied paint layer was determined. Use of the abrasive composition provided significant improvement in the attachment strength of the applied paint coat.

The following other abrasive compositions were made and tested as described above:

| | Component | % of total composition |
|---|---|---|
| Foamy formulation: | | |
| Particulate Abrasive: | Minispar 200 or 170 | 14.0 |
| Suspension Agent: | EP-1 | 6.25 |

-continued

| | | |
|---|---|---|
| Surfactant: | Rhodaplex CO 436 | 0.84 |
| | Neodol 25-7 | 0.5 |
| | Neodol 25-3 | 0.5 |
| Cleaning Agent: | Ethyl alcohol | 1.5 |
| Foam Height Stabilizer: | Ninol 30-LL | 1.0 |
| Water: | | 75.41 |
| SDS formulation: | | |
| Particulate Abrasive: | Minispar 200 or 170 | 14.0 |
| Suspension Agent: | EP-1 | 6.25 |
| Surfactant: | Aerosol OT-75 | 0.67 |
| | Neodol 25-7 | 0.5 |
| | Neodol 25-3 | 0.5 |
| Cleaning Agent: | Ethyl alcohol | 1.0 |
| | D-Limonine | 2.0 |
| Foam Height Stabilizer: | Ninol 30-LL | 1.0 |
| Water: | | 75.08 |
| Glycerine formulation: | | |
| Particulate Abrasive: | Minispar 200 or 170 | 14.0 |
| Suspension Agent: | EP-1 | 6.25 |
| Surfactant: | Aerosol OT-75 | 0.67 |
| | Neodol 25-7 | 0.5 |
| | Neodol 25-3 | 0.5 |
| Cleaning Agent: | Ethyl alcohol | 1.0 |
| | D-Limonine | 2.0 |
| Humectant: | Glycerine | 3.0 |
| Water: | | 72.08 |
| Stearic acid formulation: | | |
| Particulate Abrasive: | Minispar 200 or 170 | 5.0 |
| Suspension Agent: | Stearic acid | 8.33 |
| Surfactant: | Neodol 25-7 | 0.5 |
| | Neodol 25-3 | 0.5 |
| Cleaning Agent: | Isopar G or | 1.0 |
| | D-Limonine | |
| Neutralizer: | triethanolamine | 5.0 |
| Water: | | 80.51 |

| | Component | Without humectant (%) | With humectant (%) |
|---|---|---|---|
| Alcohol-free formulations: | | | |
| Particulate Abrasive: | Minispar 200 or 170 | 14.00 | 14.00 |
| Suspension Agent: | EP-1 | 6.25 | 6.25 |
| Surfactant: | Neodol 25-7 | 0.50 | 0.50 |
| | Neodol 25-3 | 0.50 | 0.50 |
| | OT 75 | 0.67 | |
| Cleaning Agent: | Isopar-G or D-Limonine | 2.00 | 2.0 |
| humectant: | glycerine | — | 2.00 |
| Water: | | 76.08 | 74.08 |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference.

What is claimed is:

1. A method of preparing a surface for application of a finish, said method comprising the steps of
   (i) abrading said surface with an abrasive composition that is a foam or a gel comprising:
      (a) about 1.0% to about 80% by weight of a particulate abrasive;
      (b) about 0.1% to about 10% by weight of a suspension agent;
      (c) a surfactant; and
      (d) a cleaning agent comprising an aliphatic hydrocarbon; and
   (ii) removing said abrasive composition from said surface.

2. The method of claim 1, wherein said particulate abrasive is selected from the group consisting of a pumice, silica, calcium carbonate, ninex, boron nitride, metal carbides, diamond dust, aluminum oxide, and iron oxide.

3. The method of claim 2, wherein said particulate abrasive is feldspar.

4. The method of claim 1, wherein said particulate abrasive has a particle size and hardness sufficient to dull a paint finish on said surface.

5. The method of claim 1, wherein said suspension agent is selected from the group consisting of a cellulose, a starch, an acrylic polymer, a polymer emulsion, or a clay.

6. The method of claim 1, wherein said particulate abrasive comprises about 10% to about 50% by weight of said composition.

7. The method of claim 1, wherein said surfactant comprises a high HLB surfactant and a low HLB surfactant.

8. The method of claim 7, wherein said surfactant further comprises an ionic surfactant.

9. The method of claim 1, wherein said cleaning agent comprises about 0.1% to about 5% by weight of said composition.

10. The method of claim 1, wherein said cleaning agent comprises a water soluble alcohol.

11. The method of claim 1, wherein said composition further comprises a neutralizing agent.

12. The method of claim 1, wherein said cleaning agent comprises one or more agents selected from the group consisting of ethyl alcohol, propyl alcohol, isopropyl alcohol, methyl alcohol, ethylene diol, propylene diol, ethanolamine, D-limonine, dodecane, and isopar G, ethoxylate, and Carvone.

13. The method of claim 1, wherein said cleaning agent is ethyl alcohol and D-Limonine.

14. The method of claim 1, wherein said composition further comprises a foam height stabilizer.

15. The method of claim 14, wherein said foam height stabilizer is ninol.

16. The method of claim 1, wherein
   said surfactant comprises a nonionic high HLB surfactant, a nonionic low HLB surfactant, and an ionic surfactant.

17. The method of claim 16, wherein
   said particulate abrasive is a feldspar and comprises about 14%, by weight, of said composition;
   said nonionic high HLB surfactant and nonionic low HLB surfactant each comprise about 0.5%, by weight, of said composition;
   said ionic surfactant comprises about 0.67%, by weight, of said composition;
   said cleaning agent is D-Limonine and comprises about 2%, by weight, of said composition; and
   said suspension agent is an acrylic polymer emulsion that comprises about 6.25%, by weight, of said composition.

18. The method of claim 16, wherein said abrasive composition further comprises a foam height stabilizer.

19. The method of claim 17, wherein said abrasive composition further comprises a humectant.

20. The method of claim 19, wherein said humectant is glycerine present at about 2%, by weight, of said composition.

21. The method of claim 16, wherein said surface is a metal surface.

* * * * *